(12) United States Patent
Chang et al.

(10) Patent No.: US 6,609,134 B1
(45) Date of Patent: Aug. 19, 2003

(54) APPARATUS AND METHOD FOR RETRIEVING MOVING PICTURE USING TREE-STRUCTURED MOVING PICTURE INDEX DESCRIPTOR

(75) Inventors: Hyun-Sung Chang, Taejon-shi (KR); Sang-Hoon Sull, Seoul (KR); Sang-Uk Lee, Seoul (KR); Nam-Kyu Kim, Seoul (KR)

(73) Assignee: Hyundai Electronics Industries, Kyonggi-Do (KR)

( * ) Notice: Subject to any disclaimer, the term of this patent is extended or adjusted under 35 U.S.C. 154(b) by 0 days.

(21) Appl. No.: 09/496,306

(22) Filed: Feb. 1, 2000

(30) Foreign Application Priority Data

Feb. 1, 1999  (KR) ............................................. 99-3248

(51) Int. Cl.[7] ............................................. G06F 17/30
(52) U.S. Cl. ................................... 707/104.1; 707/100
(58) Field of Search ............................ 707/104.1, 100, 707/5, 101

(56) References Cited

U.S. PATENT DOCUMENTS

| | | | | |
|---|---|---|---|---|
| 5,428,774 A | * | 6/1995 | Takahashi et al. ............. 707/9 |
| 5,758,356 A | * | 5/1998 | Hara et al. ................... 707/202 |
| 5,852,823 A | | 12/1998 | De Bonet ....................... 707/6 |
| 5,870,754 A | * | 2/1999 | Dimitrova et al. .......... 707/104 |
| 5,892,520 A | * | 4/1999 | Ioka et al. ................... 345/474 |
| 5,911,139 A | * | 6/1999 | Jain et al. ..................... 707/3 |
| 5,918,223 A | * | 6/1999 | Blum et al. .................... 707/1 |
| 6,119,123 A | * | 9/2000 | Elenbaas et al. ............ 707/102 |

OTHER PUBLICATIONS

Han et al., Eigen–Image Based Video Segmentation and Indexing, Oct. 26, 1997, IEEE, Proceedings International Conf. Image Processing, p. 538–541 vol. 2.*

* cited by examiner

Primary Examiner—Greta Robinson
(74) Attorney, Agent, or Firm—Bryan Cave LLP

(57) ABSTRACT

An apparatus and method for retrieving a moving picture using a descriptor of a tree-structured moving picture index. If the user starts a query for the retrieval of information, a decoder sends an in-index highest-order key frame number, in-index edge information and an intra-layer threshold value list of a tree-structured moving picture index descriptor stored therein to a server environment. Then, the server environment reads a key frame number and sends it to the decoder. The decoder sends a feature vector designated by the key frame number to the server environment. Subsequently, the server environment first compares the designated feature vector with a query feature vector and, thereafter, the compared result with a threshold value and retrieval precision desired by the user to determine whether the key frame number is concerned with a query picture. If the key frame number is concerned with the query picture, the server environment transfers the retrieved result to a user environment. This processing is sequentially carried out by key frame numbers.

14 Claims, 8 Drawing Sheets

FIG. 2a

KEY_FRAME [KEY_FRAME_ID]
ATTRIB=

FRAME_ID,
SHOT_ID,
POINTER_TO_FV,
LEVEL,
LIST_OF_ $\delta$ VALUES,
LIST_OF_CHILDREN,
ANNOTATION_FIELD

FIG. 2b

SHOT [SHOT_ID]
ATTRIB=

FIRST_FRAME_ID,
LAST_FRAME_ID,
LIST_OF_KEY_FRAME_ID,
LIST_OF_KEY_FRAME_ORDER,
ANNOTATION_FIELD

FIG. 2c

INDEX
ATTRIB=

FIRST_SHOT_ID,
LAST_SHOT_ID,
ROOT_KEY_FRAME_ID,
FEATURE,
DISTANOE_FUNC,
ANNOTATION_FIELD

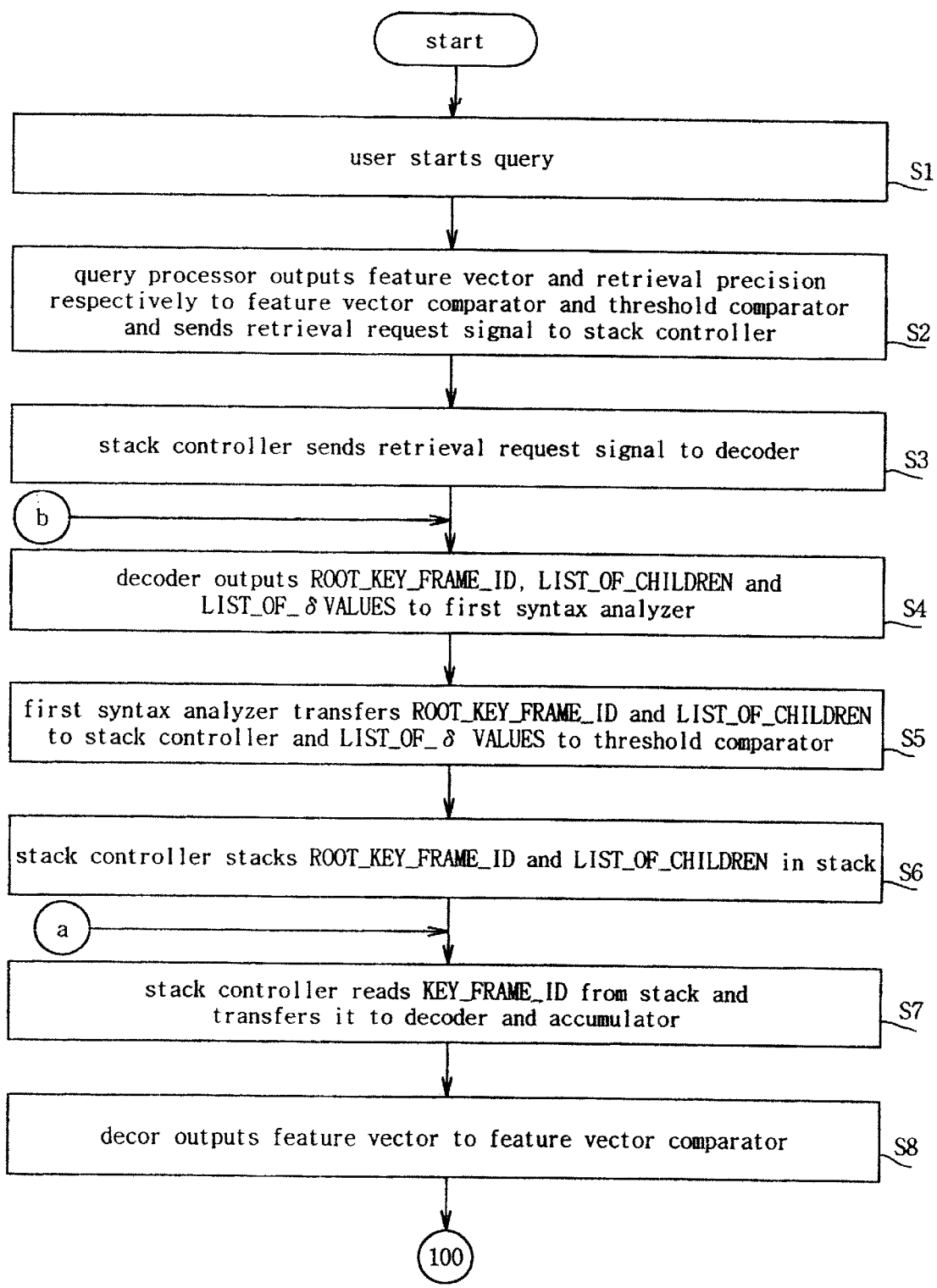

APPARATUS AND METHOD FOR RETRIEVING MOVING PICTURE USING TREE-STRUCTURED MOVING PICTURE INDEX DESCRIPTOR

BACKGROUND OF THE INVENTION

1. Field of the Invention

The present invention relates in general to a system and method for retrieving moving picture data, and more particularly to an apparatus and method for retrieving a moving picture using a descriptor of a tree-structured moving picture index, in which the tree-structured moving picture index is created on the basis of the contents of moving picture data, defined Was the descriptor and then applied to a retrieval system, so that the moving picture data can readily be retrieved.

2. Description of the Prior Art

In a conventional picture data retrieval system, there have been employed a technique for grouping and browsing pictures in a still picture database to provide a structured access to the user, a technique for retrieving a still picture using a tree-structured vector quantizer, and a technique for grouping shots to browse moving pictures.

However, the above techniques are adapted to take still pictures as objects to be retrieved, or lead a user's search to repetitive browsing rather than query-based automatic retrieval. For this reason, such techniques are not suitable to application environments where moving picture frames are automatically retrieved on the basis of a query.

Further, in extending the above techniques, it is inevitable to use an unnecessary or complex data structure in process of describing or storing data, and the application range is also limited. For example, in the case where the still picture retrieval technique based on the tree-structured vector quantizer is extended and applied to moving pictures, picture groups and a median in each group should be stored as additional data, and the number of objects exhibits an exponential increase with an increase in tree size.

SUMMARY OF THE INVENTION

Therefore, the present invention has been made in view of the above problems, and it is an object of the present invention to provide an apparatus and method for retrieving a moving picture using a tree-structured moving picture index descriptor, thereby enhancing a moving picture retrieval efficiency.

In accordance with one aspect of the present invention, in a system for retrieving a moving picture in response to a query from the user, there is provided an apparatus for retrieving the moving picture using a descriptor of a tree-structured moving picture index, comprising a decoder for storing the tree-structured index descriptor and feature vectors and outputting object information of the index descriptor and any one of the stored feature vectors designated by a specific key frame number in response to an external request; a query processor for receiving various user-defined values and a query picture/picture sequence from the user in response to the query from the user, extracting a feature vector and retrieval precision desired by the user from the received user-defined values and query picture/picture sequence and generating a retrieval request signal; a stack being a storage medium; a stack controller for sending a retrieval request signal to the decoder in response to the retrieval request signal from the query processor, receiving an in-index highest-order key frame number from the decoder, stacking the received highest-order key frame number in the stack, receiving in-index edge information from the decoder, stacking a key frame number based on the received in-index edge information in the stack, reading the stacked key frame number from the stack and outputting it as the specific key frame number to the decoder; a first syntax analyzer for receiving the in-index highest order key frame number and in-index edge information from the decoder, transferring them, to the stack controller, receiving a list of frame representative threshold values from the decoder and transferring the received threshold value list externally; a feature vector comparator for comparing the feature vector designated by the specific key frame number from the decoder with the feature vector extracted by the query processor and outputting the compared result externally; a threshold comparator for comparing the compared result from the feature vector comparator with the retrieval precision extracted by the query processor and the frame representative threshold value list transferred by the first syntax analyzer to determine whether the specific key frame number from the stack controller is concerned with the query picture and generating a control signal in accordance with the determined result; and an accumulator for accumulating the specific key frame number from the stack controller in response to the control signal from the threshold comparator and outputting the accumulated result finally if the stack is empty.

In accordance with another aspect of the present invention, there is provided a method for retrieving a moving picture using a descriptor of a tree-structured moving picture index in response to a query from the user, comprising the steps of a), if the user starts the query, allowing a query processor to receive user-defined values and a query picture/picture sequence from the user, extract a feature vector and retrieval precision desired by the user from the received user-defined values and query picture/picture sequence, output the extracted feature vector and retrieval precision respectively to a feature vector comparator and a threshold comparator and send a retrieval request signal to a stack controller; b) allowing the stack controller to send a retrieval request signal to a decoder upon receiving the retrieval request signal from the query processor; c) allowing the decoder to output a key frame number of an in-index highest-order node, included in an index object, and in-index edge information and a list of frame representative threshold values, included in a key frame object, to a syntax analyzer in response to the retrieval request signal from the stack controller; d) allowing the syntax analyzer to transfer the key frame number of the in-index highest-order node and the in-index edge information from the decoder to the stack controller and the frame representative threshold value list from the decoder to the threshold comparator; e) allowing the stack controller to stack the key frame number of the in-index highest-order node and the in-index edge information from the syntax analyzer in a stack; f) allowing the stack controller to read a specific key frame number from the stack and transfer it to the decoder and an accumulator; g) allowing the decoder to output a feature vector designated by the specific key frame number from the stack controller to a feature vector comparator and then allowing the feature vector comparator to compare the feature vector from the decoder with the feature vector extracted by the query processor at the step a) and output the compared result to the threshold comparator; h) allowing the threshold comparator to compare the compared result of the two feature vectors from the feature vector comparator with the retrieval precision extracted by the query processor at the step a) and the frame representatives threshold value list transferred by the syntax analyzer at the step d) to determine whether the specific key frame number from the stack controller is concerned with the query picture; i) returning to the step f) if the specific key frame number from the stack controller is not concerned with the query picture at the step h) and accumulating the specific key frame number from the stack controller in the accumulator if the specific key frame number is concerned with the query picture at the step h); and j) determining whether the stack is empty and allowing the accumulator to output the accumulated result to the user if the stack is empty.

In accordance with yet another aspect of the present invention, there is provided a method for retrieving a moving picture using a descriptor of a tree-structured moving picture index, comprising the steps of a) creating the tree-structured moving picture index, the step a) including the steps of a-1) upwardly sampling, an original moving picture partitioned into shots, defining each sample as a node and implying a quantitative representative relation between a sample layer and a mother layer in each edge, and a-2) repeating the step a-1) to accumulate samples into a tree structure; b) describing the created tree-structured moving picture index, the step b) including the steps of b-1) expressing key frame information and shot information respectively as randomly accessible individual objects and then expressing subordinate and representative relations between the objects using attributes, b-2) reflecting information about a highest-order node in the index and the entire information of moving picture data in a third object, and b-3) appending annotation to each of the objects using a descriptor created by the steps b-1) and b-2); and c) retrieving the moving picture using the described tree-structured moving picture index, the step c) including the step of retrieving the moving picture in connection with a retrieval precision desired by the user on the basis of the fact that each frame in the index is representative of a sub-tree, which has it as a vertex, within the range of a quantitative threshold value.

BRIEF DESCRIPTION OF THE DRAWINGS

The above and other objects, features and advantages of the present invention will be more clearly understood from the following detailed description taken in conjunction with the accompanying drawings, in which:

FIGS. 2A, 2B, 2C is a view illustrating an object-based description method for describing the tree-structured moving picture index in FIG. 1;

FIGS. 7a and 7b are flowcharts illustrating a method for retrieving a moving picture using a moving picture index descriptor in accordance with the preferred embodiment of the present invention, which is performed by the retrieval apparatus of FIG. 5.

DETAILED DESCRIPTION OF THE PREFERRED EMBODIMENTS

Figure 1:
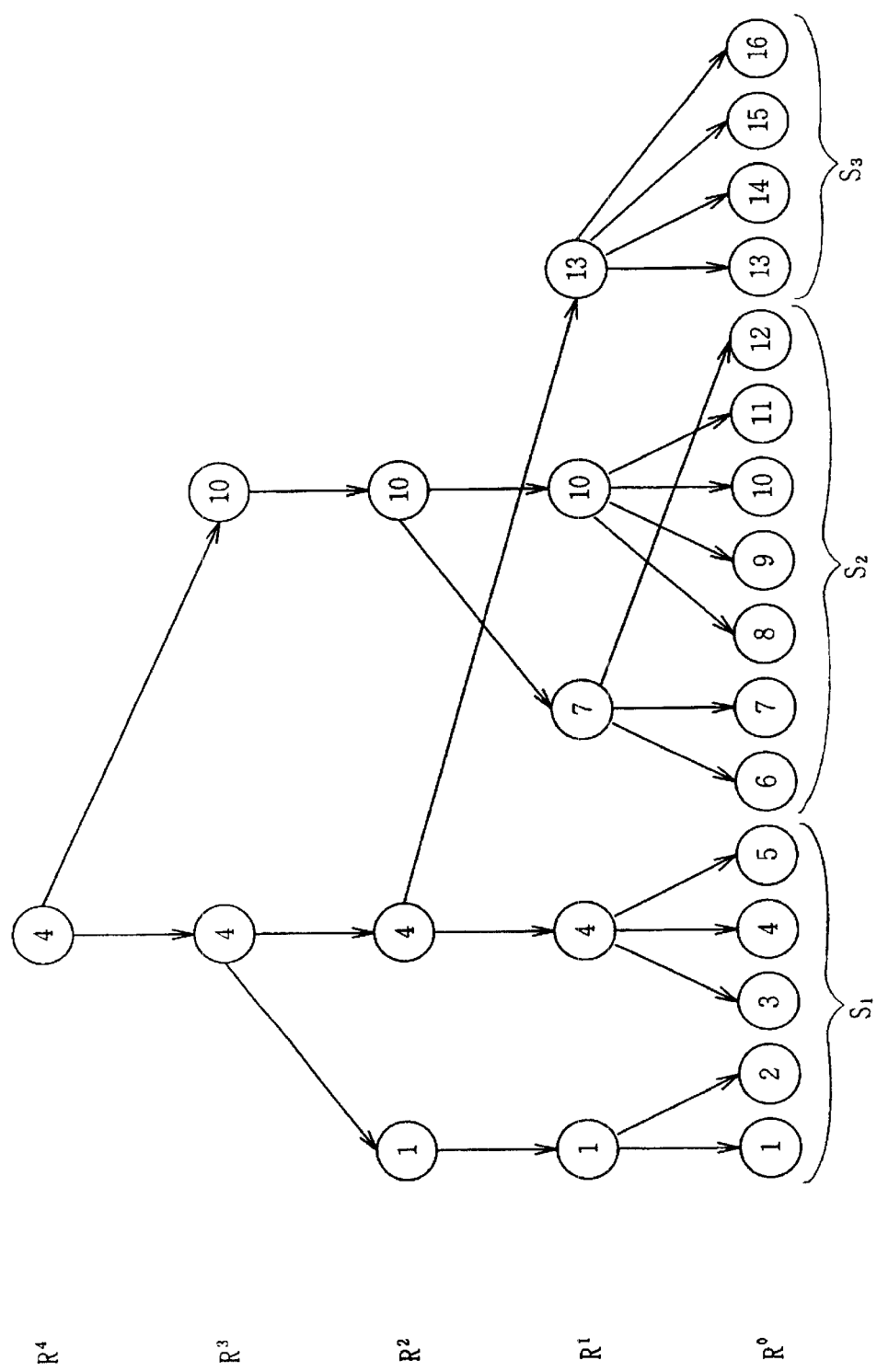
FIG. 1 is a view illustrating the concept of a tree-structured moving picture index applied to the present invention.

FIG. 1 is a view illustrating the concept of a tree-structured moving picture index applied to the present invention.

In FIG. 1, each node signifies one frame in a moving picture, and a numeral within each circle represents a number of the corresponding frame.

Further in FIG. 1, $R^0$ denotes a lowermost layer of the index, which is equal to the original moving picture except overlapped scenes or gradually shifted scenes such as faded-in or faded-out scenes and is partitioned into shots, $S_1$, $S_2$ and $S_3$, by a given scene shift detection technique.

Also, $R^k$ denotes an upper kth layer from the lowermost layer, which is created from an adjacent lower layer $R^{k-1}$ through a given sampling procedure.

The above sampling procedure allows an arbitrary node $X^k_i$ in a given layer $R^k$ to be representative of all nodes in a sub-tree $T^k_i$, if which has the node $X^k_i$ as a vertex, within the range of a quantitative threshold value $\delta^k_i$. The value of the node $X^k_i$ is calculated in an index creation procedure and then applied to a description and storage procedure.

The threshold value $\delta^k_i$ may be calculated by a given method to allow an arbitrary node to be representative of all nodes in a sub-tree which has the node as a vertex.

On the other hand, an edge of the index is created on the basis of a representative relation defined in the inter-layer sampling procedure. The upper one of two nodes interconnected by the edge is adapted to be representative of the lower node.

In the above sampling procedure, the representation of the upper layer of the lower layer may be modeled as a mathematical relation of a fidelity and an inter-layer sampling rate and be subjected to a key frame extraction method based on a graph model so that it can be approximated to an optimum solution in a layer-unit extraction procedure.

FIGS. 2a, 2b and 2c illustrate an object-based description method for describing the tree-structured moving picture index in FIG. 1.

In FIGS. 2a, 2b and 2c, objects of a key frame KEY_FRAME, shot SHOT and index INDEX are described to notify a given device of the tree structure of FIG. 1.

The key frame object KEY_FRAME represents a corresponding one of nodes included in an $R^1$ layer and over in the tree-structured moving picture index, and is randomly accessible by a corresponding key frame number KEY_FRAME_ID. The key frame object KEY_FRAME has attributes such as a frame number FRAME_ID, a number SHOT_ID of an associated shot, a pointer POINTER_TO_FV to a corresponding feature vector, a level LEVEL of an uppermost layer in the index, a list LIST_OF_δVALUES of quantitative threshold values representative of sub-trees in each layer, edge information LIST_OF_CHILDREN in the index, and frame annotation ANNOTATION_FIELD.

The shot object SHOT signifies corresponding shot information in a lowermost layer in the tree-structured moving picture index, and is randomly accessible by a corresponding shot number SHOT_ID. The shot object SHOT has attributes such as a frame number FIRST_FRAME_ID corresponding to the start of a shot, a frame number LAST_

FRAME_ID corresponding to the end of the shot, a list LIST_OF_KEY_FRAME_ID of key frame numbers of key frame objects belonging to the shot, order information LIST_OF_KEY_FRAME_ORDER of the key frame objects, and shot, annotation ANNOTATION_FIELD.

The index object INDEX expresses the entire information: of moving picture data which cannot be expressed by the two objects, or the key frame object and shot object. The index object INDEX has attributes such as a shot number FIRST_SHOT_ID corresponding to the start of a moving picture, a shot number LAST_SHOT_ID corresponding to the end of the moving picture, a key frame number ROOT_KEY_FRAME_ID of a highest-order node in the index, a feature vector FEATURE in the index, distance function information DISTANCE_FUNC, and the entire annotation ANNOTATION_FIELD about the moving picture.

Noticeably, a plurality of index objects may be provided to describe different features with respect to one moving picture and share common attributes with one another.

According to the above-mentioned object-based description method, the retrieval and sequential/hierarchical browsing can directly be supported on the basis of the above three types of objects, and information regarding a similarity between shots is implied in the edge. Hence, the above description method is able to prepare the ground for other operations.

In more detail, the above object-based description method comprises the step of expressing key frame information and shot information respectively as randomly accessible individual objects and then expressing subordinate and representative relations between the objects using attributes, the step of reflecting information about a highest-order node in an index and the entire information of moving picture data in a third object, and the step of appending annotation to each of the objects using a descriptor created by the above two steps.

Figure 3:
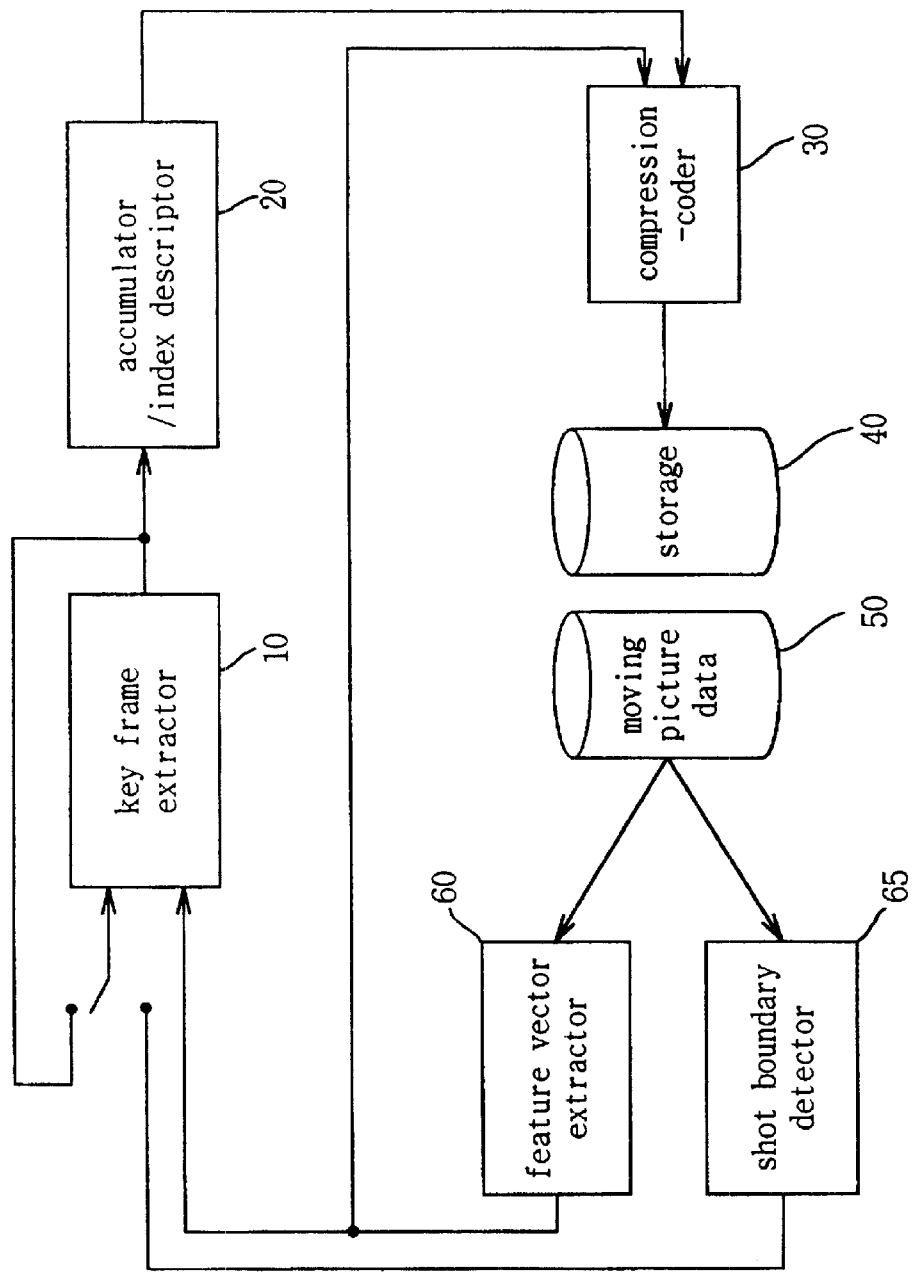
FIG. 3 is a block diagram illustrating a procedure of creating and storing a moving picture index descriptor, which is applied to the present invention.

FIG. 3 is a block diagram illustrating a procedure of creating and storing a moving picture index descriptor, which is applied to the present invention.

First, a feature vector extractor 60 extracts a feature vector from each frame of moving picture data 50, and a key frame extractor 10 performs a sampling operation using the feature vector extracted by the feature vector extractor 60. At this time, the key frame extractor 10 initially utilizes moving picture shot information from a shot boundary detector 65 and, thereafter, its output value fed back thereto, which is sampled layer information.

Subsequently, an accumulator/index descriptor unit 20 accumulates layers obtained by the key frame extractor 10 to create a tree-structured index and then describes the created index on the basis of the objects in FIGS. 2a, 2b and 2c. Thereafter, the resultant descriptor from the accumulator/index descriptor unit 20 and the feature vector from the feature vector extractor 60 are stored in a storage unit 40.

On the other hand, a compression-coder 30 is generally required for the efficient storage of the descriptor in the present invention, but a description thereof will be omitted because it is well known in the art.

Figure 4:
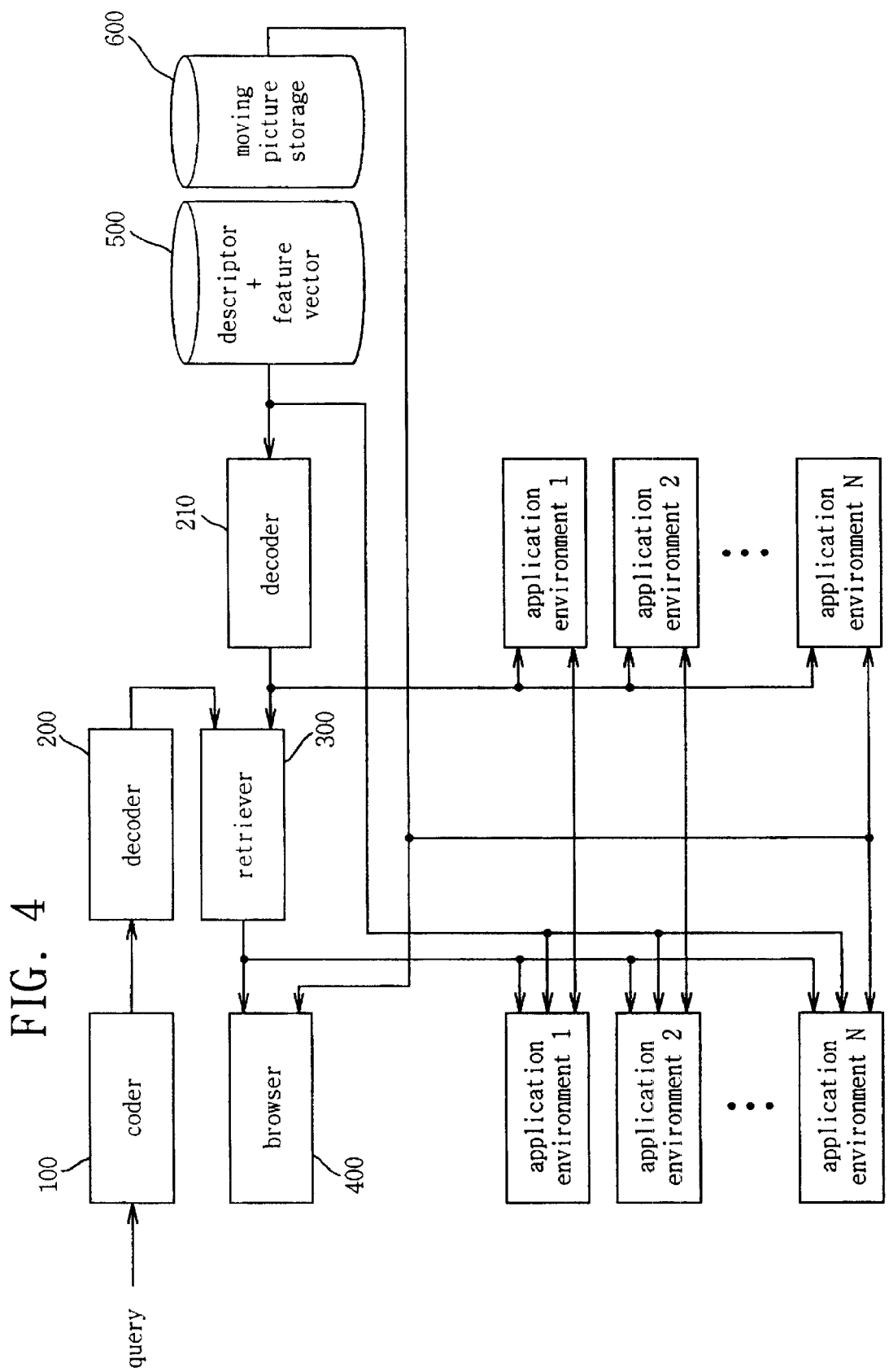
FIG. 4 is a block diagram illustrating general examples of application environments employing the moving picture index descriptor and a feature vector stored in FIG. 3.

FIG. 4 is a block diagram illustrating general examples of application environments employing the moving picture index descriptor and feature vector stored in FIG. 3.

A system manager at a server stage can utilize application environments 1, 2 and 3, each of which edits annotation, or one of attributes of each object, using a descriptor and feature vector decoded by a decoder 210. A plurality of remote users may perform a query retrieval operation on a retriever 300 through a coder 100 and decoder 200 or utilize other application environments such as browsing.

Figure 5:
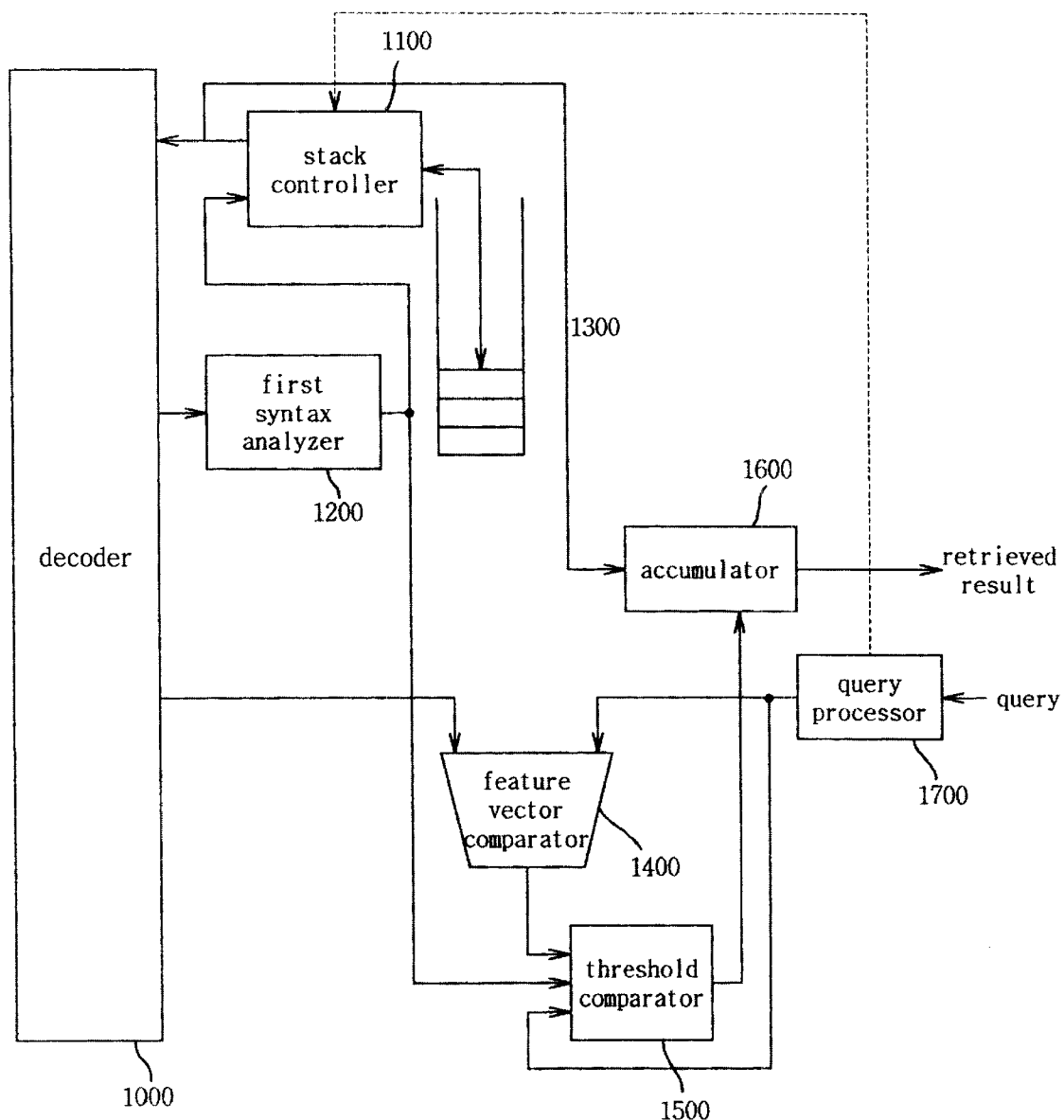
FIG. 5 is a block diagram of an apparatus for retrieving a moving picture using a moving picture index descriptor in accordance with the preferred embodiment of the present invention.
Figure 6:
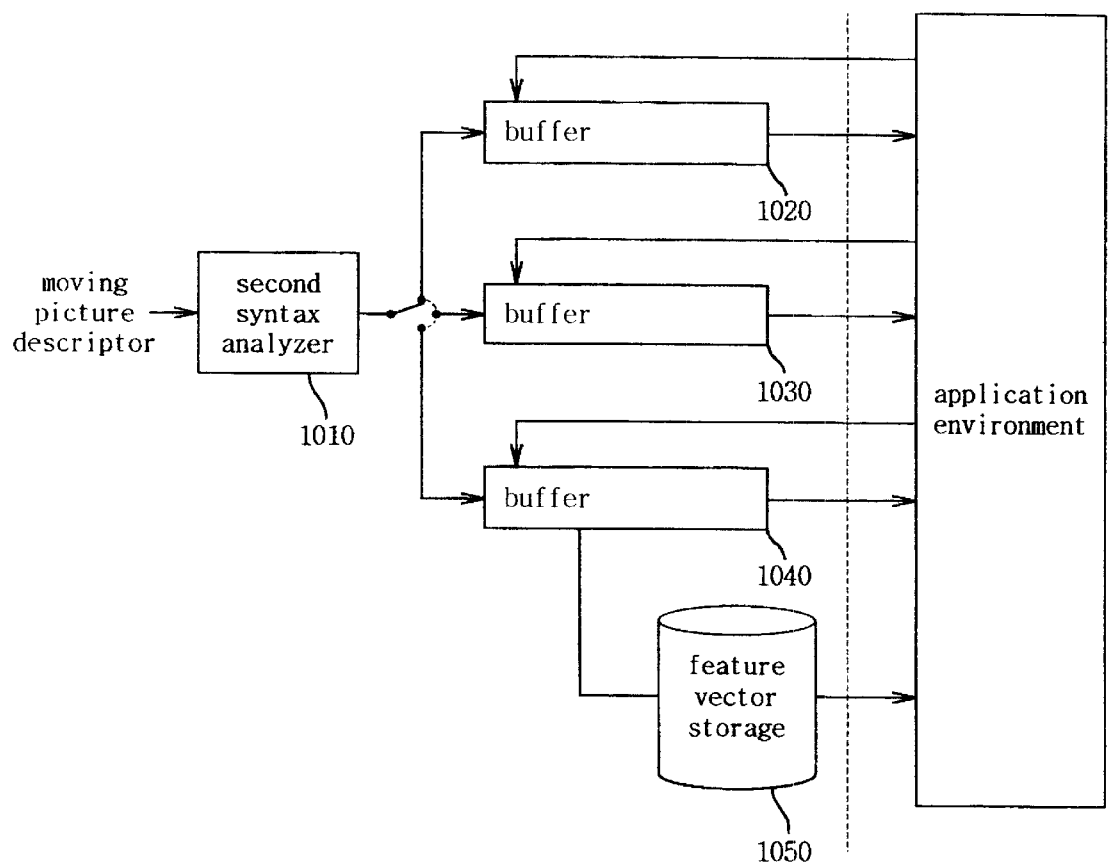
FIG. 6 is a detailed block diagram of a decoder in FIG. 5.

FIG. 5 is a block diagram of an apparatus for retrieving a moving picture using a moving picture index descriptor in accordance with the preferred embodiment of the present invention, and FIG. 6 is a detailed block diagram of a decoder in FIG. 5.

A query processor 1700 receives various user-defined values and a query picture/picture sequence from the user in response to a query from the user and extracts a feature vector and retrieval precision desired by the user from the received user-defined values and query picture/picture sequence. The query processor 1700 then acts to generate a retrieval request signal to a stack controller 110.

A first syntax analyzer 1200 receives a key frame number ROOT_KEY_FRAME_ID of an in-index highest-order node, included in an index object, and in-index edge information LIST_OF_CHILDREN, included in a key frame object, from a decoder 1000 and transfers the received key frame number and in-index edge information to the stack controller 1100. The first syntax analyzer 1200 further receives a list LIST_OF_δVALUES of frame representative threshold values, included in the key frame object, from the decoder 1000 and transfers the received threshold value list to a threshold comparator 1500.

A stack 1300 is a storage medium. Upon receiving the retrieval request signal from the query processor 1700, the stack controller 1100 first sends a retrieval request signal to the decoder 1000 to receive the key frame number ROOT_KEY_FRAME_ID of the in-index highest-order node from the first syntax analyzer 1200 and stack the received key frame number in the stack 1300. Then, the stack controller 1100 performs an operation of stacking a key frame number KEY_FRAME_ID based on the in-index edge information LIST_OF_CHILDREN from the first syntax analyzer 1200 in the stack 1300 or deleting it from the stack 1300.

A feature vector comparator 1400 compares a feature vector designated by a key frame number KEY_FRAME_ID, from the decoder 1000 with the feature vector extracted by the query processor 1700 and outputs the compared result to the threshold comparator 1500.

An accumulator 1600 is adapted to accumulate key frame numbers KEY_FRAME_ID associated with the query picture. In response to a control signal from the threshold comparator 1500, the accumulator 1600 determines whether a currently compared frame will be accumulated and outputs the accumulated result finally if the stack 1300 is empty.

The decoder 1000 is adapted to store a tree-structured index descriptor and a feature vector. In response to the retrieval request signal from the stack controller 1100, the decoder 1000 outputs object information ROOT_KEY_FRAME_ID, LIST_OF_CHILDREN and LIST_OF_δVALUES and a feature vector designated by a key frame number KEY_FRAME_ID.

As shown in FIG. 6, the decoder 1000 is provided with a second syntax analyzer 1010, first to third buffers 1020, 1030 and 1040 and a feature vector storage unit 1050.

The feature vector storage unit 1050 functions to store feature vectors and transfer any one of the stored feature vectors designated by a key frame number KEY_FRAME_ID of the third buffer 1040 to an application environment.

The second syntax analyzer 1010 receives a moving picture index descriptor stored in a storage space of a server or client and classifies the received index descriptor into an index object INDEX, a shot object SHOT and a key frame object KEY_FRAME according to attributes on the basis of a length or in response to a control signal in the index descriptor. The second syntax analyzer 1010 further outputs the index object INDEX, shot object SHOT and key frame object KEY_FRAME respectively to the first to third buffers 1020, 1030 and 1040.

The first to third buffers 1020, 1030 and 1040 are adapted to store the index object INDEX, shot object SHOT and key frame object KEY_FRAME from the second syntax analyzer 1010, respectively. The first to third buffers 1020, 1030 and 1040 are randomly accessible by control signals such as a key frame number KEY_FRAME_ID and shot number SHOT_ID. In response to an object request signal or access control signal from an application environment, each of the first to third buffers 1020, 1030 and 1040 transfers information of the associated object to the application environment.

The key frame object KEY_FRAME includes a pointer to a corresponding feature vector FV.

Now, a description will be given of a method for retrieving a moving picture using a moving picture index descriptor in accordance with the preferred embodiment of the present invention, with reference to FIGS. 7a and 7b.

Figure 7B:
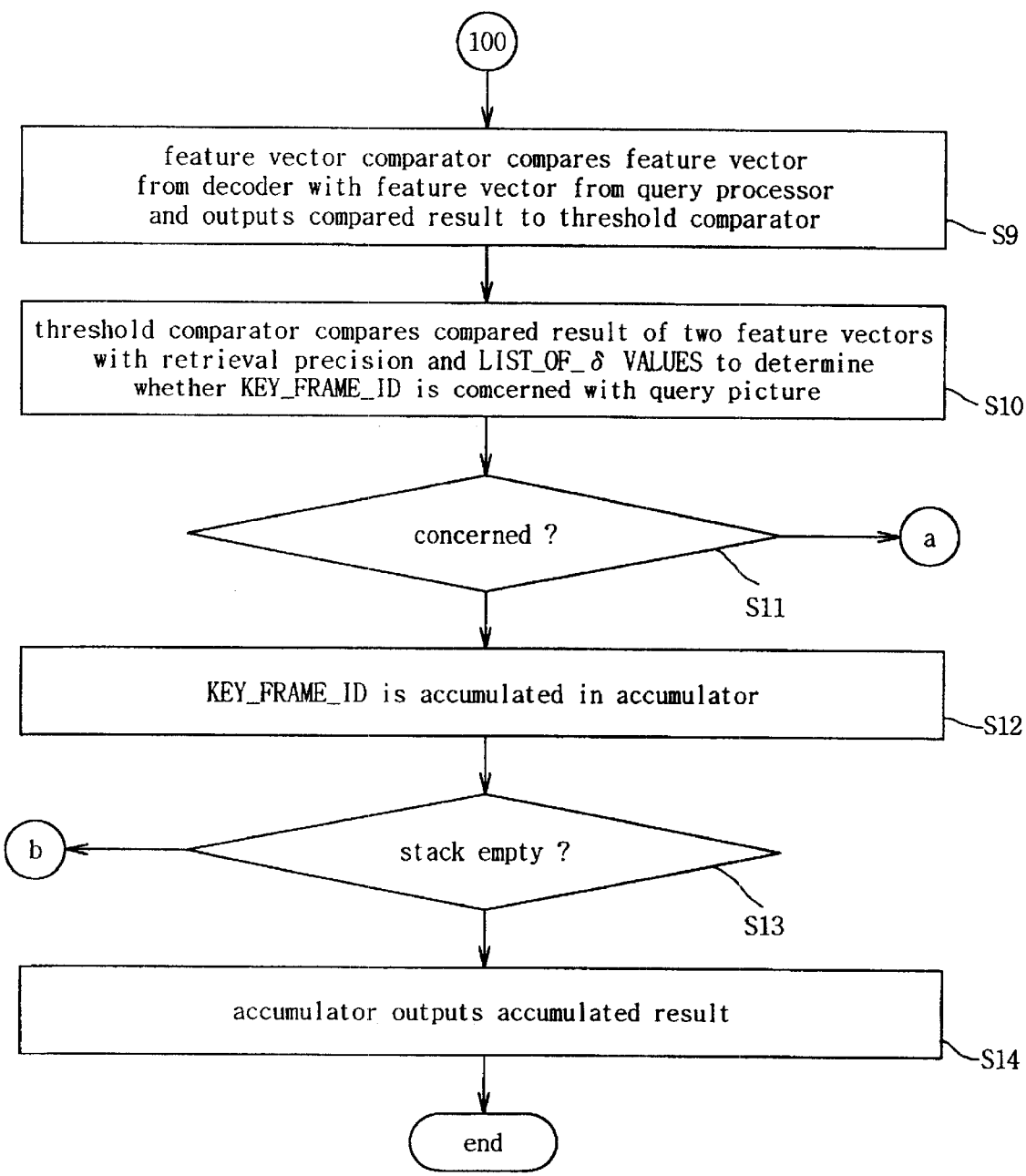

FIGS. 7a and 7b are flowcharts illustrating a method for retrieving a moving picture using a moving picture index descriptor in accordance with the preferred embodiment of the present invention, which is performed by the retrieval apparatus of FIG. 5.

If the user starts a query at step S1, the query processor 1700 receives various user-defined values and a query picture/picture sequence from the user at step S2. Then, the query processor 1700 extracts a feature vector and retrieval precision desired by the user from the received user-defined values and query picture/picture sequence and outputs the extracted feature vector and retrieval precision respectively to the feature vector comparator 1400 and threshold comparator 1500. Further, the query processor 1700 sends a retrieval request signal to the stack controller 110.

Upon receiving the retrieval request signal from the query processor 1700, the stack controller 1100 sends a retrieval request signal to the decoder 1000 at step S3. In response to the retrieval request signal from the stack controller 110, the decoder 1000 outputs a key frame number ROOT_KEY_FRAME_ID of an in-index highest-order node, included in an index object, and in-index edge information LIST_OF_CHILDREN and a list LIST_OF_δVALUES of frame representative threshold values, included in a key frame object, to the first syntax analyzer 1200 at step S4.

The first syntax analyzer 1200 transfers the key frame number ROOT_KEY_FRAME_ID of the in-index highest-order node, and the in-index edge information LIST_OF_CHILDREN from the decoder 1000 to the stack controller 1100 at step S5. The first syntax analyzer 1200 further transfers the frame representative threshold value list LIST_OF_δVALUES from the decoder 1000 to the threshold comparator 1500. At step S6, the stack controller 1100 stacks the key frame number ROOT_KEY_FRAME_ID of the in-index highest-order node and the in-index edge information LIST_OF_CHILDREN from the first syntax analyzer 1200 in the stack 1300. Further, at step S7, the stack controller 1100 reads a key frame number KEY_FRAME_ID from the stack 1300 and transfers it to the decoder 1000 and accumulator 1600.

The decoder 1000 outputs a feature vector designated by the key frame number KEY_FRAME_ID from the stack controller 1100 to the feature vector comparator 1400 at step S8. At step S9, the feature vector comparator 1400 compares the feature vector from the decoder 1000 with the feature vector extracted by the query processor 1700 at the above step S2 and outputs the compared result to the threshold comparator 1500.

At step S10, the threshold comparator 1500 compares the compared result of the two feature vectors from the feature vector comparator 1400 with the retrieval precision extracted by the query processor 1700 at the above step S2 and the frame representative threshold value list LIST_OF_δVALUES transferred by the first syntax analyzer 1200 at the above step S5 to determine whether the key frame number KEY_FRAME_ID from the stack controller 1100 is concerned with the query picture. If the key frame number KEY_FRAME_ID from the stack controller 1100 is not concerned with the query picture at step S11, the operation returns to the above step S7. To the contrary, in the case where the key frame number KEY_FRAME_ID from the stack controller 1100 is concerned with the query picture at step S11, it is accumulated in the accumulator 1600 at step S12.

It is then determined at step S13 whether the stack 1300 is empty. Unless the stack 1300 is empty, the operation returns to the above step S4. However, if the stack 1300 is empty, the accumulator 1600 outputs the accumulated result, or retrieved result, to the user at step S14 and the operation is then ended.

On the other hand, at the above steps S4 to S6, the key frame number ROOT_KEY_FRAME_ID of the in-index highest-order node is received and used from the decoder 1000 only at the beginning of the user's query.

As apparent from the above description, according to the present invention, if the user starts a query for the retrieval of information, a decoder sends an in-index highest-order key frame number, in-index edge information and an intra-layer threshold value list of a tree-structured moving picture index descriptor stored therein to a server environment. Then, the server environment reads a key frame number and sends it to the decoder. The decoder sends a feature vector designated by the key frame number to the server environment. Subsequently, the server environment first compares the designated feature vector with a query feature vector and, thereafter, the compared result with a threshold value and retrieval precision desired by the user to determine whether the key frame number is concerned with a query picture. If the key frame number is concerned with the query picture, the server environment transfers the retrieved result to a user environment. This processing is sequentially carried out on the basis of a sequence of key frame numbers.

Although the above-mentioned retrieval method has been disclosed to process one query picture for illustrative purpose, those skilled in the art will appreciate that various modifications, additions and substitutions are possible. For example, a sequence of query pictures may be processed on the basis of the object-based descriptor of the present invention.

Further, the object-based descriptor of the present invention is capable of increasing an operation efficiency in performing operations based on any other contents than the retrieval system. Moreover, the object-based descriptor of the present invention may be expressed as a scene shift graph through a relatively simple structural conversion because the inter-frame relation and inter-shot relation are previously implied in the index edge.

A content-based data retrieval can generally be evaluated in two aspects, or effectiveness and efficiency. The present invention is able to greatly increase the efficiency under the condition that it inflicts no loss on the effectiveness. Further, the present invention is expected to prepare the ground for applying operations based on various contents including the retrieval to moving picture data on the basis of a relatively small descriptor.

Therefore, according to the present invention, the moving picture retrieval apparatus and method using the tree-structured moving picture index descriptor have the effect of allowing the user to rapidly retrieve desired moving picture information.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. In a system for retrieving a moving picture in response to a query picture from a user, an apparatus for retrieving the moving picture using a descriptor having a tree-structured moving picture index of the moving picture, comprising:

a decoder for storing the descriptor and feature vectors of the moving picture and outputting object information of the descriptor and any one of the feature vectors designated by a specific key frame number;

a query processor for receiving various user-defined values and a query picture from the user, extracting a query feature vector from the query picture and retrieval precision from the user-defined values and generating a first retrieval request signal;

a stack for storing lower-order key frame numbers of the specific key frame number;

a stack controller for sending a second retrieval request signal to said decoder in response to the first retrieval request signal from said query processor, receiving an in-index highest-order key frame number from said decoder, stacking the highest-order key frame number in said stack, receiving in-index edge information from said decoder, stacking a key frame number based on the in-index edge information in said stack, reading the stacked key frame number from said stack and outputting it as the specific key frame number to said decoder;

a first syntax analyzer for receiving the in-index highest order key frame number and the in-index edge information from said decoder, transferring them to said stack controller, receiving a list of frame representative threshold values from said decoder and transferring the received threshold value list externally;

a feature vector comparator for comparing the feature vector designated by the specific key frame number from said decoder with the query feature vector extracted by said query processor and outputting the compared result externally;

a threshold comparator for comparing the compared result from said feature vector comparator with the retrieval precision extracted by said query processor and the frame representative threshold value list transferred by said first syntax analyzer to determine whether the specific key frame number from said stack controller is concerned with the query picture and generating a control signal in accordance with the determined result; and an accumulator for accumulating the specific key frame number from said stack controller in response to the control signal from said threshold comparator and outputting the accumulated result finally if said stack is empty.

2. The apparatus as set forth in claim 1, wherein said decoder: includes:

a second syntax analyzer for receiving the descriptor, classifying it into an index object, a shot object and a key frame object according to attributes on the basis of a length or in response to the control signal in the descriptor and outputting the classified index object, the shot object and the key frame object individually;

a feature vector storage unit for storing the feature vectors and transferring any one of the stored feature vectors designated by the specific key frame number to an application environment; and first to third buffers, each of said buffers storing a corresponding one of the index object, the shot object and the key frame object from said second syntax analyzer and transferring information of the stored object to said application environment in response to an object request signal or an access control signal from the application environment, said first to third buffers being randomly accessible by the key frame number and the shot number from the application environment.

3. The apparatus as set forth in claim 1, wherein the tree-structured moving picture index is created by performing the steps of:

a) upwardly sampling the moving picture partitioned into shots, defining each sample as a node and implying a quantitative representative relation between a sample layer and a mother layer in each edge; and b) repeating said step a) to accumulate samples into a tree structure to a predetermined layer.

4. The apparatus as set forth in claim 3, wherein said step a) includes the step of allowing the sample layer to be representative of the mother layer within the range of quantitative threshold value and defining a representative relation between each sample and each frame in the mother layer and a representative threshold range of each sample.

5. The apparatus as set forth in claim 3, wherein the tree-structured moving picture index includes a key frame object, a shot object and an index object.

6. The apparatus as set forth in claim 5, wherein the key frame object has a plurality of attributes, the attributes being a frame number, a number of an associated shot, a pointer to a corresponding feature vector, a level of an uppermost layer in the index, a list of quantitative threshold values representative of sub-trees in each layer, edge information in the index, and frame annotation.

7. The apparatus as set forth in claim 5, wherein the shot object has a plurality of attributes, the attributes being a frame number corresponding to the start of a shot, a frame number corresponding to the end of the shot, a list of key frame numbers of key frame objects belonging to the shot, order information of the key frame objects, and shot annotation.

8. The apparatus as set forth in claim 5, wherein the index object has a plurality of attributes, the attributes being a shot number corresponding to the start of said moving picture, a shot number corresponding to the end of the moving picture, a key frame number of a highest-order node in the index, a feature vector in the index, distance function information, and the entire annotation about the moving picture.

9. The apparatus as set forth in claim 3, wherein the tree-structured moving picture index is described by performing the steps of:

a) expressing key frame information and shot information respectively as randomly accessible individual objects and then expressing subordinate and representative relations between the objects using attributes;

b) reflecting information about a highest-order node in the index and the entire information of moving picture data in a third object; and c) appending annotation to each of said objects using a descriptor created by said steps a) and b).

10. The apparatus as set forth in claim 9, wherein the tree-structured moving picture index includes a plurality of index objects for describing different features with respect to one moving picture.

11. A method for retrieving a moving picture using a descriptor having a tree-structured moving picture index of the moving picture, comprising the steps of:

a) retrieving the moving picture based on the descriptor having the tree-structured moving picture index of the moving picture;

b) interrupting said step a) if a representative threshold value of a frame is larger than a threshold value determined according to a retrieval precision desired by the user on the basis of the fact that each frame in the tree-structured moving picture index is representative of a sub-tree, the frame being a vertex of the sub-tree, within the range of a quantitative threshold value.

12. A method for retrieving a moving picture using a descriptor having a tree-structured moving picture index of the moving picture in response to a query picture from the user, comprising the steps of:

a) allowing a query processor to receive user-defined values and a query picture from the user, extract a query feature vector from the query picture and retrieval precision from the user-defined values, output the query feature vector and the retrieval precision respectively to a feature vector comparator and a threshold comparator and send a first retrieval request signal to a stack controller;

b) allowing the stack controller to send a second retrieval request signal to a decoder upon receiving the first retrieval request signal from the query processor;

c) alowing the decoder to output a key frame number of an in-index highest-order node, included in an index-object, and in-index edge information and a list of frame representative threshold values, included in a key frame object, to a syntax analyzer in response to the retrieval request signal from the stack controller;

d) allowing the syntax analyzer to transfer the key frame number of the in-index highest-order node and the in-index edge information from the decoder to the stack controller and the frame representative threshold value list from the decoder to the threshold comparator;

e) allowing the stack controller to stack the key frame number of the in-index highest-order node and the in-index edge information from the syntax analyzer in a stack;

f) allowing the stack controller to read a specific key frame number from the stack and transfer it to decoder and an accumulator;

g) allowing the decoder to output a feature vector designated by the specific key frame number from the stack controller to a feature vector comparator and then allowing the feature vector comparator to compare the feature vector from the decoder with the query feature vector extracted by the query processor at said step a) and output the compared result to the threshold comparator;

h) allowing the threshold comparator to compare the compared result of from the feature vector comparator with the retrieval precision extracted by the query processor at said step a) and the frame representative threshold value list transferred by the syntax analyzer at said step d) to determine whether the specific key frame number is concerned with the query picture by determining whether the feature vector designated by the specific key frame number satisfies with the retrieval precision and the frame representative threshold value;

i) returning to said step f) if the specific key frame number from the stack controller is not concerned with the query picture at said step h} and accumulating the specific key frame number from stack controller in the accumulator if the specific key frame number is concerned with the query picture at said step h); and j) determining whether the stack is empty, and allowing the accumulator to output the accumulated result to the user if stack is empty.

13. The method as set forth in claim 12, further including the step of, returning to said step c) if the stack is not empty.

14. A method for retrieving a moving picture using a descriptor having a tree-structured moving picture index of the moving picture, comprising the steps of:

a) creating the tree-structured moving picture index, wherein said step a) includes the steps of: a-1) extracting a descriptor and feature vectors from the moving picture; a-2) upwardly sampling the moving picture, which is partitioned into shots, defining each sample as a node and defining a quantitative representative relation between a sample layer and a mother layer as an edge; and a-3) repeating said step a-2) to accumulate samples into the tree-structured moving picture index to a predetermined layer; and b) retrieving the moving picture based on the tree-structured moving picture index, wherein said step b) includes the step of: b-1) retrieving the moving picture in connection with a retrieval precision desired by the user on the basis of the fact that each frame in the tree-structured moving picture index is representative of a sub-tree, the frame being a vertex of the sub-tree, within the range of a quantitative threshold value, wherein the tree-structured moving picture index includes a key frame information, shot information and index information, each of which has annotation about the moving picture, wherein the key frame information and the shot information are randomly accessible and represent subordinate and representative relations between the objects using attributes, and wherein the index information includes a highest-order node in the tree-structured moving picture index and the entire information of moving picture data.

* * * * *